Figure 1:
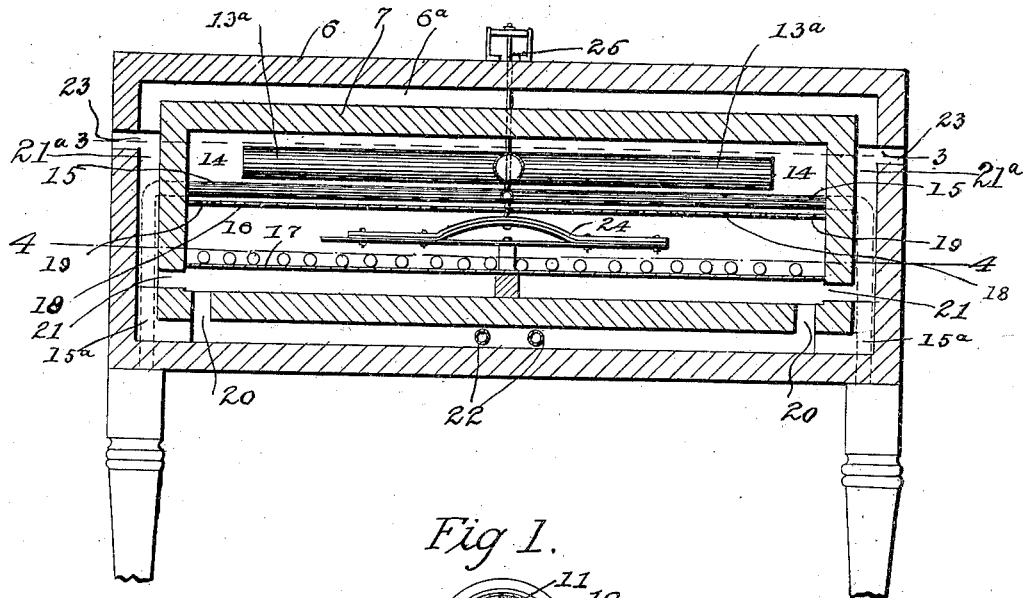

No. 709,650.  
O. P. SCOTT.  
INCUBATOR.  
(Application filed Sept. 23, 1901.)

Patented Sept. 23, 1902.

(No Model.)

2 Sheets—Sheet 1.

WITNESSES:
F. N. Darrow
O. E. Murray

INVENTOR
Oliver P. Scott

BY
Milo B. Stevens & Co.
ATTORNEYS.

THE NORRIS PETERS CO., PHOTO-LITHO., WASHINGTON, D. C.

No. 709,650. Patented Sept. 23, 1902.
O. P. SCOTT.
INCUBATOR.
(Application filed Sept. 23, 1901.)
(No Model.) 2 Sheets—Sheet 2.

WITNESSES:
H. N. Darrow
O. E. Murray

INVENTOR
Oliver P. Scott
BY
Milo B. Stevens & Co.
ATTORNEYS.

UNITED STATES PATENT OFFICE.

OLIVER P. SCOTT, OF CHICAGO, ILLINOIS.

INCUBATOR.

SPECIFICATION forming part of Letters Patent No. 709,650, dated September 23, 1902.

Application filed September 23, 1901. Serial No. 76,191. (No model.)

*To all whom it may concern:*

Be it known that I, OLIVER P. SCOTT, a citizen of the United States, residing at Chicago, in the county of Cook and State of Illinois, have invented certain new and useful Improvements in Incubators; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to incubators. Its object is to provide improved means for regulating the temperature of the air in the incubator and also to improve the quality of the air admitted with respect to both the amount of oxygen and the amount of moisture therein. A proper supply of oxygen and moisture in the air admitted to incubators is essential, and the former is supplied by an improved construction whereby the air does not pass through or in contact with the heater-flame, so that no fumes pass into the egg-chamber, and a proper amount of moisture is supplied by admitting fresh cold air otherwise than through the heater, whereby the deficiency of moisture in the air which has passed through the heater is corrected.

The invention further comprises separated air and egg chambers having therebetween a plate with perforations near the outer edges thereof, together with hot and cold air inlet pipes in the air-chamber having therein a number of small discharge-openings in several parts of the chamber, whereby the hot and cold air currents are thoroughly mixed in the air-chamber before reaching the eggs and the air is delivered into the egg-chamber near the corners and outer parts thereof. When a hot-air pipe is passed directly into or through an egg-chamber, the parts distant from the pipe are liable to be colder than the nearer parts, so that an equable temperature is not preserved.

A further object of my invention is to improve the circulation of air through the incubator by passing some of the outlet-pipes under the influence of the heater, so as to accelerate the delivery of air by creating a suction from the egg-chamber.

With these and other objects in view an embodiment of my invention is hereinafter described, and is illustrated in the accompanying drawings, in which—

Figure 3:
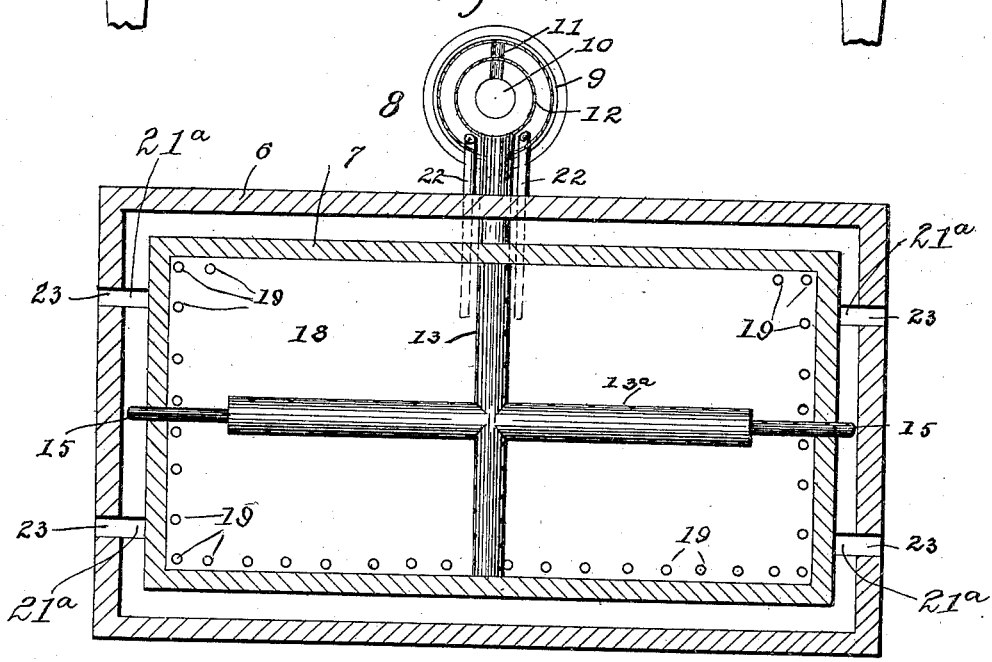
Figure 2:
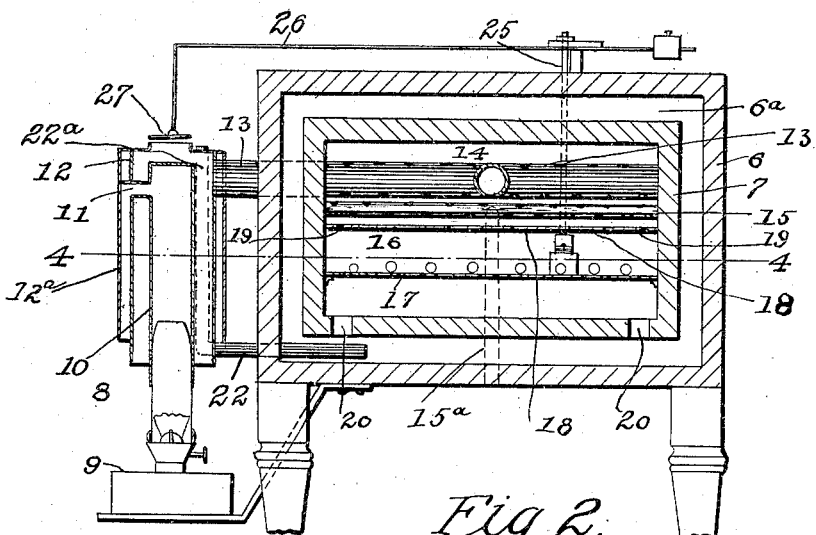
Figure 4:
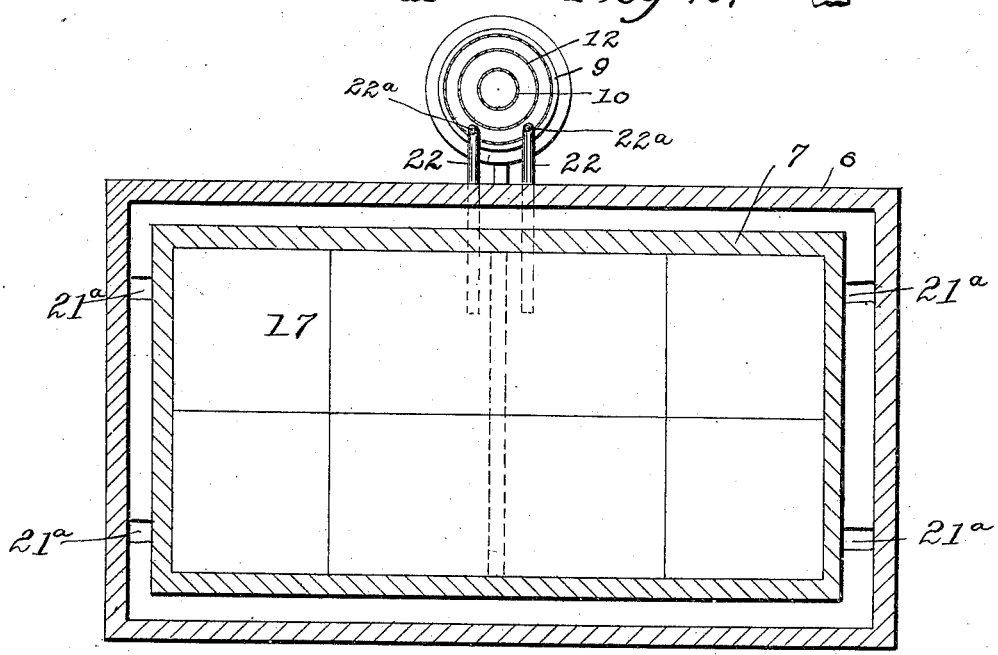

Figure 1 is a longitudinal vertical section. Fig. 2 is a vertical cross-section. Fig. 3 is a horizontal section on the line 3 3 of Fig. 1, and Fig. 4 is a horizontal section on the line 4 4 of Figs. 1 and 2.

Referring particularly to the drawings, the outer case of the incubator is indicated at 6, and the inner case at 7, having the space $6^a$ between which may be filled, except between the bottoms of the casings, with cotton, mineral wool, or other suitable non-conductor of heat. The heater is indicated at 8, comprising a lamp 9, the chimney of which communicates with an interior cylinder 10, which is closed at the top. A pipe 11 communicates with this cylinder and conducts the fumes from the lamp without the cylinder or drum 12 into a superheating outer drum $12^a$, whence it passes down and is discharged from the bottom thereof into the outer air. The drum 12 forms a heating-chamber for the pure air entering the drum at the bottom thereof. A pipe 13, extending through the inner and outer casings, conducts the heated air into an air-mixing chamber 14, located in the top of the inner casing. The pipe 13 has lateral branches $13^a$, and the pipe and its branches are provided with perforations through which the air is discharged and distributed, as will be understood.

Within the mixing-chamber 14, below and in close proximity to the hot-air pipe 13, is a cold-air pipe 15. The ends of this pipe extend through the end or side walls of the inner casing and are provided with vertical extensions $15^a$, which communicate through the bottom of the outer casing with the outside air. The pipe 15 is provided with lateral extensions and perforations similar to the hot-air pipe.

The egg-chamber 16 is situated in the lower part of the inner casing and is provided with the usual egg-trays 17. A sheet-iron or other metal plate separates the mixing-chamber 14 from the egg-chamber 16. This plate is indicated at 18 and at the ends and outer edge thereof is provided with perforations 19. By this construction the hot and cold air discharged from the pipes in the mixing-chamber is mixed or commingled and then passes through the perforations downwardly into the egg-chamber. Inasmuch as the perforations are at the edge of the plate, the air is delivered at the edges and corners of the egg-chamber, whereby a more equable temperature is preserved therein. After having passed over the eggs the stale air is discharged through openings 20 in the bottom of the inner case into the space between the bottoms of the casings and through openings 21 into passages 21ª between the sides of the casings, which passages communicate with the openings 23 in the outer casing. Pipes 22 extend from the space between the casing-bottoms outwardly through the outer casing in proximity to the heater and extend thence upwardly through the drum thereof, as indicated at 22ª. By this means the air in the pipes is heated, causing an accelerated discharge and effectively promoting the circulation of air through the incubator. The air escaping through the openings 21 passes by a normal flow through the passages 21ª between the casings and is discharged through the openings 23 in the outer casing.

The incubator is also provided with a suitable thermostat 24, connected by a rod 25 with a lever 26, by which a damper 27 to the drum is operated.

Having thus described the invention, what is claimed as new, and desired to be secured by Letters Patent, is—

1. In an incubator, in combination, outer and inner casings, air-mixing and egg chambers in the inner casing, a perforated air-spreading partition between said chambers, to deliver air from the mixing-chamber to various parts of the egg-chamber, and hot and cold air supply pipes having numerous adjacent discharge-openings in remote parts of the mixing-chamber.

2. In an incubator, in combination, a casing, an egg-chamber and an air-mixing chamber therein, hot-air and cold-air inlet pipes communicating with the mixing-chamber, and a perforated partition between the mixing-chamber and the egg-chamber.

3. In an incubator, in combination, an egg-chamber and an air-chamber therein, an inlet air-pipe having a number of small openings in remote parts of the air-chamber, and a partition between the egg-chamber and the air-chamber having openings therein only near the outer edge thereof.

4. In an incubator, in combination, a casing, a perforated air-distributing partition therein forming air and egg chambers, and foraminate hot and cold air supply pipes extending in proximity to remote parts of the air-chamber.

5. An incubator comprising inner and outer casings spaced apart, an egg-chamber in the inner casing, a heater, an air-supply pipe extending therefrom into the inner casing, air-discharge openings in the bottom of the inner casing communicating with the space between the bottoms of the casings, a tube extending from said space to the heater whereby the air is heated to accelerate the discharge, and independent discharge-passages extending from the egg-chamber through the casings.

In testimony whereof I affix my signature in presence of two witnesses.

OLIVER P. SCOTT.

Witnesses:
 NELLIE FELTSKOG,
 HARRY G. BATCHELOR.